United States Patent Office 3,225,002
Patented Dec. 21, 1965

3,225,002
DIESTERS OF TERMINALLY UNSATURATED
MONOCARBOXYLIC ACIDS AND HALO-
PHENOXYMETHYL, ALKANE DIOLS
Marco Wismer and Roger M. Christenson, Gibsonia, Pa.,
assignors to Pittsburgh Plate Glass Company, Pittsburgh, Pa., a corporation of Pennsylvania
No Drawing. Filed Feb. 17, 1961, Ser. No. 89,919
12 Claims. (Cl. 260—47)

This invention relates to novel chlorine containing diesters, and to the preparation thereof, and pertains more specifically to the reaction of halogenated diols with unsaturated monocarboxylic acids, to produce novel halogen containing diesters which homopolymerize or copolymerize with other monomeric materials to give useful polymers.

It is known that the $CH_2{=}C{<}$ linkage in unsaturated monocarboxylic acids such as acrylic acid or methacrylic acid is quite reactive, and the free acids as well as the esters thereof are frequently utilized as one component of polymerizable mixtures. It is also known that the presence of halogen in a polymer appears to enhance to a considerable extent the frame retardant properties thereof.

The interest in flame retardant acrylates is evidenced by the work of Sumrel et al., as reported in the Journal of the American Chemical Society, volume 81, 1959, towards producing halogenated phenyl methacrylates. Also, U.S. Patent 2,338,683 discloses esters of halogenated aryloxysubstituted lower alcohols with certain unsaturated aliphatic monocarboxylic acids. In each of these instances the esters have the limitation of being monofunctional.

It has now been discovered that it is possible to combine in a single difunctional monomer the reactive properties of the unsaturated monocarboxylic acid, and the fire retardant properties of chlorine, bromine or fluorine. This is accomplished in the present invention by reacting a halogenated diol, such as 2-pentachlorophenoxymethyl-2-ethyl 1,3-propanediol, with an unsaturated monocarboxylic acid. In this process a diester is formed by the reaction between the alcohol radicals and the hydroxyl radical of the carboxylic acid group with the elimination of water. The reaction is believed to proceed substantially as follows, wherein 2-pentachlorophenoxymethyl-2-ethyl 1,3-propanediol and methacrylic acid are used for illustrative purposes:

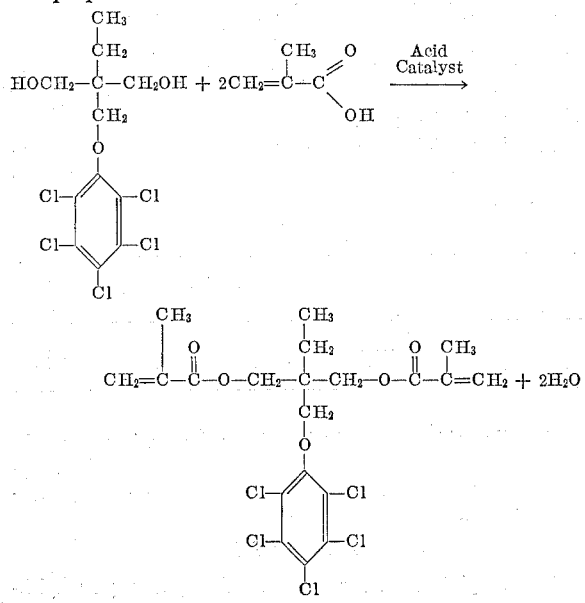

Alternative methods of preparation of said diester include the ester interchange reaction wherein the diol is reacted with a low-boiling ester of the monoethylenically unsaturated carboxylic acid in the presence of a catalyst, and the acid chloride-diol reaction wherein a monoethylenically unsaturated carboxylic acid chloride is reacted with the diol, preferably in the presence of an acid acceptor such as pyridine.

The novel compounds prepared by reactions of the type described hereinabove possess the following structure:

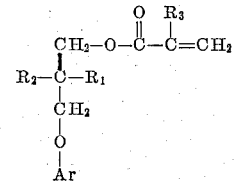

wherein $R_1$ is

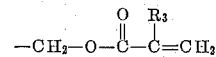

or

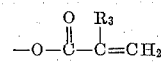

$R_2$ is a hydrogen radical or an alkyl radical containing 1 to 10 carbon atoms, with the limitation that when $R_1$ is

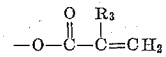

then $R_2$ can be only hydrogen; $R_3$ is a member of the class consisting of halogen radicals, hydrogen and alkyl radicals (such as methyl, ethyl, propyl, butyl, amyl, octyl, dodecyl and the like); and Ar is a mononuclear aromatic hydrocarbon radical containing from 1 to 5 halogen substituents selected from the class consisting of chlorine, bromine and fluorine.

Compounds of this type polymerize in the presence of catalysts, such as peroxygen compounds, to form hard, clear homopolymers, or can be polymerized with other monomers, such as methyl methacrylate and the like, to give interpolymers with many useful properties, the most important being fire retardation. In addition to fire retardation, homopolymers and interpolymer castings made from the herein described difunctional monomers have vastly improved hardness and high-temperature heat distortion properties over similar castings prepared from previously known monofunctional monomers.

Suitable unsaturated monocarboxylic acids for the above described reaction include acrylic acid, methacrylic acid, ethacrylic acid, alpha-chloroacrylic acid, alpha-bromoacrylic acid, alpha-fluoroacrylic acid, and similar materials.

Some diols, such as 2-pentachlorophenoxymethyl-2-ethyl 1,3-propanediol and the like, used as reactants in this invention have been known for only relatively short periods of time. Copending application Serial No. 844,180, filed October 5, 1959, discloses the preparation of such diols as 2-pentachlorophenoxymethyl-2-ethyl 1,3-propanediol by the reaction of trimethylolpropane and hexachlorobenzene in the presence of a hydrogen chloride acceptor, such as sodium hydroxide, sodium carbonate and the like. The reaction therein disclosed involves admixing the reactants in a suitable solvent such as dimethoxymethane, dimethoxyethane and the like, with best results obtained at elevated temperatures. The salt formed by the reaction is removed by filtration or other means, after which the solvent is removed by vacuum distillation.

Other diols, such as 1-pentachlorophenoxy 2,3-propanediol, 1-pentabromophenoxy 2,3-propanediol, 1-pentafluorophenoxy 2,3-propanediol, 1-monochlorophenoxy 2,3-propanediol, 1-dichlorophenoxy 2,3-propanediol, 1-trichlorophenoxy 2,3-propanediol, 1-monobromophenoxy 2,3-propanediol and the like can be used as reactants in this invention. Copending application Serial No. 811,003, filed May 5, 1959, now Patent No. 3,004,073, discloses a new method of preparation of such diols as 1-pentachlorophenoxy 2,3-propanediol by the hydrolysis of pentachlorophenyl glycidyl ether in the presence of a strong acid catalyst such as sulfuric acid.

The halogentaed diols obtained by the above procedures are generally solid materials. It is accordingly desirable that the esterification reaction be carried out in a solvent utilized in an amount such as to provide a readily stirrable reaction mixture. Suitable solvents include benzene, toluene, xylene and the like. An acid catalyst such as benzenesulfonic acid, p-toluenesulfonic acid, or mineral acids such as phosphoric acid, sulfuric acid, and the like, is desirable to promote the esterification reaction. A reaction temperature of about 60° C. to 110° C. is desired to minimize the polymerization of the unsaturated monocarboxylic acid. It is also desirable that a polymerization inhibitor be included to preclude the polymerization of the unsaturated monocarboxylic acid. Such inhibitors for this purpose include hydroquinone, picric acid, dinitrophenol, p-cyclohexyl phenol, catechols, and the like.

As indicated hereinabove, two moles of the unsaturated monocarboxylic acid are required stoichiometrically to react with one mole of the diol. Generally a slight excess of the diol is used to insure complete esterification of the acid, although other ratios may also be employed.

As the reaction proceeds water is formed. The water is preferably removed by azeotropic distillation with benzene, and subsequent phase separation, with the benzene being returned to the reaction vessel. Removal of the water promotes faster reaction since the esterification reaction is reversible. The reaction tempertaure is determined by the azeotropic boiling point of the solvent and water. When the reaction is complete, which can be determined by the amount of water removed, the benzene is separated from the product by vacuum distillation.

The monomeric compounds obtained by the process described hereinabove polymerize readily when heated in the presence of a small amount of a peroxygen catalyst such as benzoyl peroxide, cumene hydroperoxide, lauroyl peroxide, acetayl peroxide, or the like, to give homopolymers which are hard and strong, and which, as indicated hereinabove, are unusually flame retardant. In a similar manner, these monomers can be admixed with other monomeric materials in the presence of a catalyst and heated to give interpolymers which also possess many useful properties including the excellent flame retardation of the homopolymers.

The following examples illustrate in detail the preparation of novel monomers by the reaction of halogenated diols with unsaturated monocarboxylic acids, and the polymerization of such monomers to form homopolymers and interpolymers. The examples are not intended to limit the invention, however, for there are, of course, numerous possible variations and modifications.

*Example I*

The methacrylate diester of 2-pentachlorophenoxymethyl-2-ethyl 1,3-propanediol was prepared utilizing the following materials in the amounts set forth:

| | Grams |
|---|---|
| 2-pentachlorophenoxymethyl-2-ethyl 1,3-propanediol (OH value 293.7) | [1] 195.0 |
| Methacrylic acid | [2] 87.5 |
| Benzenesulfonic acid | 10.0 |
| Picric acid | 0.44 |
| Benzene | 176.0 |

[1] 1.02 equivalents.
[2] 1.00 equivalent.

These materials were admixed in a glass reaction vessel. The benzene was added during the heating of the other materials to promote solubilization and to control reflux temperature. At 60° C. a clear, light yellow solution was obtained. After 3½ hours refluxing at 91° C., the reaction was complete.

The resulting solution was washed with aqueous NaCl and NaHCO₃ and filtered giving a clear yellow filtrate. After adding 0.565 gram of hydroquinone, the benzene was vacuum distilled (0–5 mm. of Hg) at a pot temperature of 55° C. A dark yellow, syrupy fluid was obtained. This fluid was recrystallized from a n-heptane solvent, yielding a white precipitate. After several recrystallizations from an acetone solution, white crystals were obtained and subsequently recovered by filtration.

The crystals obtained were analyzed by infra-red and microanalysis. The infra-red analysis indicated the presence of the carbonyl group and the double bond. The microanalysis of the resultant crystals was compared with the theoretical composition of the desired diester.

| | Percent carbon | Percent hydrogen | Percent chlorine |
|---|---|---|---|
| Experimental values | 46.32 | 4.21 | 34.21 |
| Theoretical values | 46.31 | 4.05 | 34.20 |

The saponification number of the resulting crystals was 216.0 as compared with the theoretical value of 216.6 for the diester. A melting point of 75° C.–75.5° C. was obtained.

*Example II*

The methacrylate diester of 2-pentachlorophenoxymethyl-2-methyl 1,3-propanediol was prepared utilizing the following materials in the amounts set forth:

| | Grams |
|---|---|
| 2 - pentachlorophenoxymethyl - 2 - methyl 1,3-propanediol (OH value 304.1) | [1] 72.9 |
| Methacrylic acid | [2] 33.7 |
| Benzenesulfonic acid | 3.8 |
| p-Cyclohexyl phenol | 0.78 |

[1] 0.395 equivalent.
[2] 0.387 equivalent.

These materials were admixed in a glass reaction vessel. The reaction procedure was similar to the previous example. The reaction product was separated from the benzene solvent by vacuum distillation and then recrystallized from acetone solutions.

The white crystals obtained by recrystallization sintered at 81.7° C. and melted at 82.5° C.–83° C. The saponification number of the resultant crystals was 224.1 compared with a theoretical saponification number of 222.5 for the desired diester.

A microananlysis of the resultant crystals was compared with the theoretical composition of the desired diester.

| | Percent carbon | Percent hydrogen | Percent chlorine |
|---|---|---|---|
| Experimental values | 45.60 | 3.82 | 34.94 |
| Theoretical values | 45.21 | 3.77 | 35.15 |

Acrylic acid, when substituted for the methacrylic acid used in this example, reacts similarly, yielding the acrylate diester of 2-pentachlorophenoxymethyl-2-methyl 1,3-propanediol.

*Example III*

The acrylate diester of 2-pentachlorophenoxymethyl-2- ethyl 1,3-propanediol was prepared utilizing the following materials in the amounts set forth:

| | Grams |
|---|---|
| 2 - pentachlorophenoxymethyl - 2 - ethyl 1,3-propanediol (OH value 29.0) | [1] 198.0 |
| Acrylic acid | [2] 82.8 |
| Benzenesulfonic acid | 10.0 |
| p-Cyclohexyl phenol | 3.0 |
| Benzene | 176.0 |

[1] 1.02 equivalents.
[2] 1.00 equivalent.

These materials were admixed in a glass reaction vessel. The reaction procedure was similar to previous examples. The reaction product was separated from the benzene solvent by vacuum distillation. The crude product was solubilized with ether and then washed several times with $NaHCO_3$ solution and with water. The ether solution was dried over $Na_2SO_4$, then the ether was removed by vacuum distillation. A light yellow viscous product was obtained. The saponification number of this product was 209.9 as compared with a theoretical value of 227 for the desired diester.

*Example IV*

A casting of a methacrylate diester, similar to that prepared in Example I was made by adding 28.46 grams of molten methacrylate diester to a glass container containing 431 milligrams of benzoyl peroxide dissolved in 1.77 grams of methyl methacrylate. This solution was poured into a cell and oven cured. After 2½ hours at 170° F., the material had gelled. Over an eight-hour period the temperature was gradually raised to 325° F. The temperature was held at 325° F. for two additional hours. The resultant casting was clear with a light yellow tint.

The casting was found to be very flame resistant and qualified as self-extinguishing when tested according to ASTM Test Method D–635–44. The casting was held in a flame for 30 seconds and then removed from the flame. The casting ceased to produce a flame immediately after removal, which is very superior according to ASTM specifications which consider a self-extinguishing period of 60 seconds as flame retardant.

*Example V*

The methacrylate ester of 1-pentachlorophenoxy 2,3-propanediol was prepared utilizing the following materials in the amounts set forth:

| | Grams |
|---|---|
| 1-pentachlorophenoxy 2,3-propanediol | [1] 177.5 |
| Methacrylic acid | [2] 87.3 |
| Benzenesulfonic acid | 10.0 |
| Dinitrophenol | 2.0 |

[1] 1.02 equivalents.
[2] 1.00 equivalent.

These materials were admixed and heated in a glass reaction vessel. During the heating of these materials 200 milliliters of benzene were added to promote solubilization and to control reflux temperature. At 60° C. a dark, yellow solution was obtained. The solution was heated to 84° C., at which temperature it began to reflux. The reaction was continued for about 23 hours at which time a temperature of 127° C. had been reached and a total of 16.6 milliliters of water had been collected.

The resulting solution was diluted with benzene and washed with 5 percent aqueous NaOH to remove any unreacted acid and the dinitrophenol inhibitor. The solution was then washed with water and filtered. Five hundred thirty (530) milligrams of hydroquinone were added and the benzene was removed by vacuum distillation.

The resulting monomer polymerized in the presence of a peroxide catalyst to form a fire retardant casting as shown in Example VI below.

Acrylic acid, when substituted for the methacrylic acid used in this example, reacts similarly, yielding the acrylate diester of 1-pentachlorophenoxy 2,3-propanediol.

*Example VI*

A casting of the methacrylic diester prepared in Example V was made by adding 71 milligrams of ditertiary butyl peroxide to 14.3 grams of the molten diester. This solution was poured into a cell and oven cured for 4½ hours at a maximum temperature of 280° F.

The casting was found to be very flame resistant and qualified as self-extinguishing when tested according to ASTM Test Method D–635–44. The casting ceased to produce a flame within 1 to 2 seconds after removal from a flame. This is very superior according to ASTM specifications which consider a self-extinguishing period of 60 seconds as being indicative of a flame retardant material.

Interpolymers of described diesters may be prepared by reacting with vinyl monomers such as styrene, vinyl chloride, acrylic acid, methacrylic acid, methyl methacrylate, methyl acrylate and the like.

Although specific examples of the invention have been set forth hereinabove, it is not intended that the invention be limited solely thereto, but to include all the variations and modifications falling within the scope of the appended claims.

We claim:

1. A diester of an alpha, beta, monoethylenically unsaturated monocarboxylic acid in which the unsaturation is present in a terminal $CH_2=C<$ group, with a halophenoxymethyl alkanediol, in which at least one of the hydroxy groups is a primary group, and wherein the halogen is selected from the class consisting of chlorine, bromine and fluorine and the alkanediol group attached to the halophenoxymethyl radical contains from about 2 to 12 carbon atoms wherein no hydroxyl group is attached to a carbon atom which is more than three carbon atoms from the either linkages.

2. The composition of matter of claim 1 wherein the halogen is chlorine.

3. The composition of matter of claim 2 wherein the monoethylenically unsaturated carboxylic acid is acrylic acid.

4. The composition of matter of claim 2 wherein the monoethylenically unsaturated carboxylic acid is methacrylic acid.

5. The acrylate diester of 2-pentachlorophenoxymethyl-2-ethyl 1,3-propanediol.

6. The methacrylate diester of 2-pentachlorophenoxymethyl-2-ethyl 1,3-propanediol.

7. The acrylate diester of 2-pentachlorophenoxymethyl-2-methyl 1,3-propanediol.

8. The methacrylate diester of 2-pentachlorophenoxymethyl-2-methyl 1,3-propanediol.

9. The methacrylic diester of 1-pentachlorophenoxy 2,3-propanediol.

10. A compound of the structure

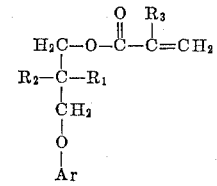

wherein $R_1$ is a member of the class consisting of

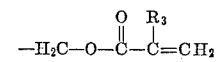

and

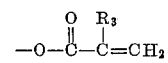

$R_2$ is a member of the class consisting of hydrogen radicals and alkyl radicals containing from 1 to 10 carbon atoms with $R_2$ being hydrogen when $R_1$ is

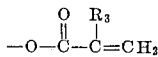

$R_3$ is a member of the class consisting of halogen radicals, hydrogen radicals and alkyl radicals and Ar is a mononuclear aromatic hydrocarbon containing from 1 to 5 halogen substituents selected from the class consisting of chlorine, bromine and fluorine.

11. The compound of claim 10 wherein $R_1$ is

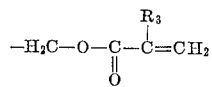

$R_2$ is alkyl and $R_3$ is hydrogen.

12. An interpolymer of the diester of claim 1 with at least one polymerizable monomer containing a $CH_2=C<$ group.

References Cited by the Examiner

UNITED STATES PATENTS

| | | | |
|---|---|---|---|
| 2,755,303 | 7/1956 | Schnell | 260—486 |
| 3,004,073 | 10/1961 | Wismer et al. | 260—613 |
| 3,056,843 | 10/1962 | Wismer | 260—613 |

FOREIGN PATENTS 788,278  12/1957  Great Britain.

OTHER REFERENCES

Weinman et al.: Chem Abstracts, vol. 41, 4885e (1947).

WILLIAM H. SHORT, *Primary Examiner.*

H. N. BURSTEIN, *Examiner.*